Patented Aug. 14, 1923.

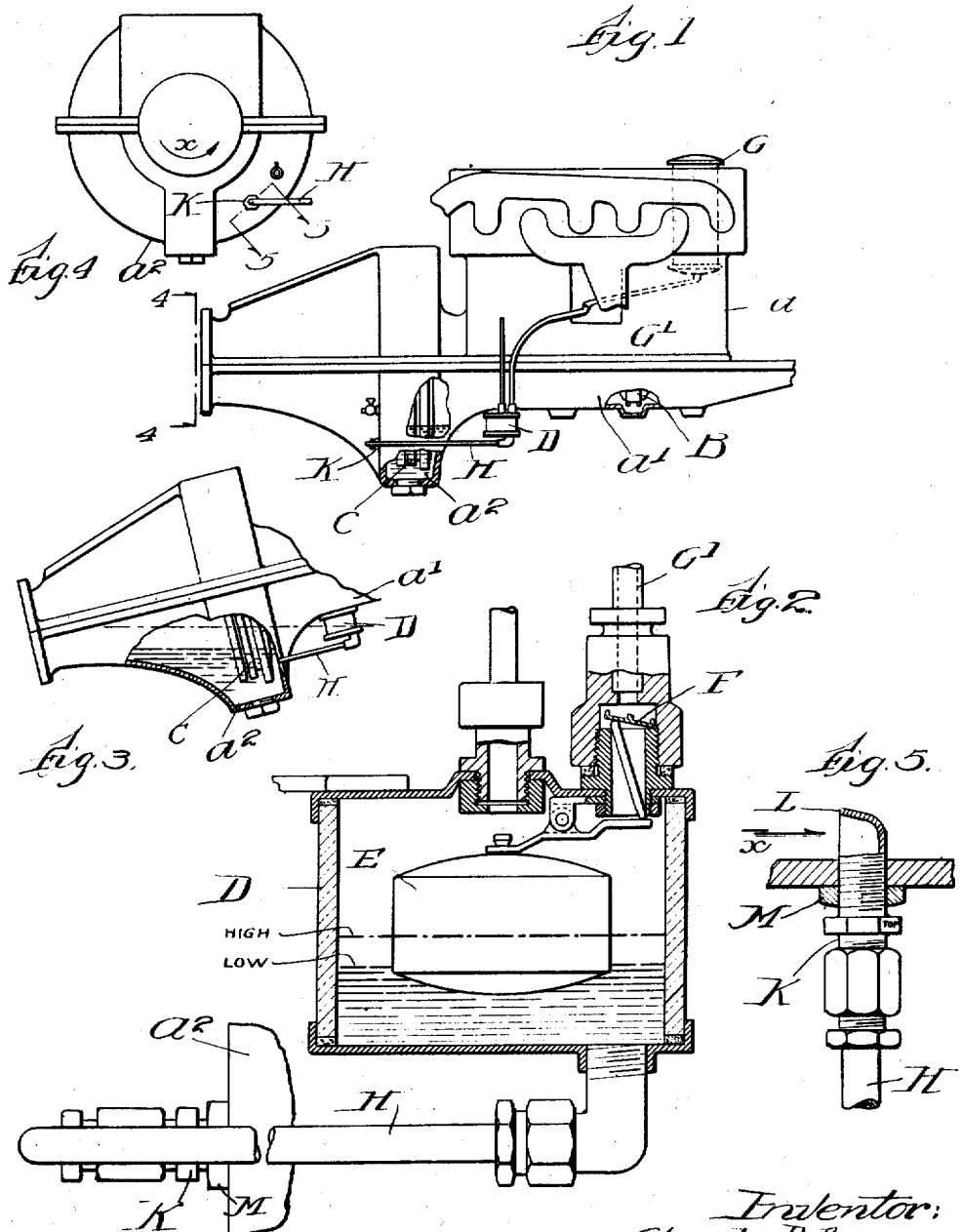

1,464,599

UNITED STATES PATENT OFFICE.

CHARLES D. DUNCAN, OF CHICAGO, ILLINOIS.

ENGINE-CRANK-CASE LUBRICANT SUPPLYING AND GOVERNING DEVICE.

Application filed February 14, 1921. Serial No. 444,972.

*To all whom it may concern:*

Be it known that I, CHARLES D. DUNCAN, a citizen of the United States, residing at Chicago, in the county of Cook and State of Illinois, have invented certain new and useful Improvements in Engine-Crank-Case Lubricant Supplying and Governing Devices, of which the following is a specification, reference being had to the accompanying drawings, forming a part thereof.

The purpose of this invention is to provide an improved construction for supplying and governing the supply of lubricant to the crank case of an internal combustion engine. It consists of the elements and features of construction shown and described, as indicated in the claims.

In the drawings:

Figure 1 is a side elevation of an engine equipped with this device for showing the relative position of the parts.

Figure 2 is a detail fore-and-aft vertical section through the float chamber and its connections and including a portion of the crank case adjacent thereto.

Figure 3 is a view similar to Figure 1, showing the engine inclined at an ascending grade.

Figure 4 is a section at the line, 4—4, on Figure 1.

Figure 5 is a detail section of the oil intake fitting for discharge of the oil into the crank case.

In the drawings there will be recognized the familiar construction of a well known type of automobile engine, in which the crank case, A, comprises not only the portion, $A^1$, in which the cranks, B, revolve, but a lower extending and circularly enlarged portion or pocket, $A^2$, located rearward of the position of the cranks and accommodating and enclosing the fly wheel and certain gears and other rotating parts indicated at C, which dip in the oil and by their rotation serve to distribute the oil to all the parts requiring lubrication in the crank case.

The level to which it is desirable to maintain the lubricant supply in the crank case is one which cuts this fly wheel casing or pocket below the level of the lowest sweep of the cranks. Heretofore it has been customary when a liquid level governing float chamber with the float in it has been provided for governing the level of the lubricant in the crank case, to locate such level-governing device at the rear side of said pocket, that is, at the opposite side from the crank space, with the result that with the engine in longitudinally inclined position as in ascending a grade, the governing device is relatively lowered with respect to the pocket; and vice versa, when the engine is inclined, as in descending a grade, the governing device is elevated relatively to the pocket. In the present invention a float chamber, D, is provided through which the lubricant is supplied to the crank case, said chamber having a float, E, a governing valve, F, which controls the inflow of lubricant from the float chamber, D, through the conduit, $G^1$, from the supply reservoir, G, which is supported at a suitably elevated position on the engine. One characteristic of this invention consists in locating this float chamber at the forward side of the pocket. The discharge from the float chamber is effected by a conduit, H, for delivering oil into the float chamber somewhat below the level at which the oil should be maintained in the chamber, which is a level intermediate the customary upper and lower pet-cocks; and for such connection the lower pet-cock is removed and substituted by a proper fitting, K, with the purpose and result that the discharge of the lubricant from the float chamber into the crank case is at a level at which the drive or "splash" of the oil caused by the rotation of the fly wheel and other rotating parts of the engine dipping in the oil when the engine is running, tends to hold back the oil which might otherwise flow by gravity from the reservoir, G, through the conduit, $G^1$, and the float chamber, D. When the engine is inclined, as in ascending a grade (see Figure 3), the float chamber being elevated relatively to the pocket and to the oil entrance thereto, the depth to which the crank-case could be filled so far as governed by the float chamber, would be excessively high, so that the engine might be flooded; but in this situation the oil is of maximum depth in the pocket, and furthermore, is deepest on the side on which the oil intake connection is made; and the "drive" of the oil against the intake, caused by the rotation of the engine parts is rendered more effective by the depth and quantity of oil engaged; and thereby the increase of head of oil due to the elevation of the float chamber is offset and inflow is prevented, notwithstanding the increase of head. On the other hand, when the engine is inclined as in descending a grade, the float chamber is lowered relatively to the pocket and the oil intake thereto; and the oil level, as governed by the float chamber independently of the rotation of the engine parts, would normally be low, ensuring against flooding; and the resulting deficiency of oil within the sweep of the rotating part at the oil intake side of the pocket, causing the "drive" against the intake to be relatively inefficient for holding back the oil, does not materially diminish the efficiency of the construction and arrangement for the purpose indicated.

Desirably for maximum drive of the oil against the intake, the intake fitting has its discharge directed back with respect to the direction of rotation of the rotating parts which produce the drive, so that the centrifugal or tangential movement of the oil indicated by arrow $x$ on Figures 4 and 5 is toward or opposed to the oil discharge at the intake. This is seen in the lip, L, with which the fitting, K, is terminated, causing the discharge orifice to be at the side when the fitting is inserted at the pet-cock opening, as shown,—that opening being not on the periphery of the fly wheel casing, but at the side near the periphery. For ensuring that the fitting shall be set tight with the discharge in the proper direction, that is, facing the drive, the mark "top" may be made on the fitting hexagon which should be at the top to bring the orifice into proper position, and the jam nut, M, will be tightened when the fitting has been turned to this position.

I claim:—

1. In combination with an engine crank case, a lubricant-level-governing device comprising a float chamber through which the lubricant is supplied to the crank case, a float therein and a valve controlled by the float for controlling the flow of lubricant into said chamber, the intake from the float chamber into the crank case having its discharge orifice in the crank case open in the reverse of the direction of rotation of the oil-giving parts of the engine; whereby the oil in the crank case is driven back in opposition to the discharge of the oil from the float chamber.

2. In the construction defined in claim 1 foregoing, the discharge orifice from the float chamber into the crank case having within the crank case a hood or lip positioned with respect to said orifice and with respect to the direction of drive of the oil by the rotating parts, for impact of the driven oil against the lip and directing the same into said orifice.

3. In the construction defined in claim 1 foregoing, the crank case having a pocket into which lubricant can flow when the engine is longitudinally inclined downward toward the pocket, the float chamber being located at the forward side of said pocket.

4. In the construction defined in claim 1 foregoing, the crank case having a pocket at one end into which lubricant can flow when the engine is longitudinally inclined donward toward that end, the discharge orifice from the float chamber into the crank case being at the rear side of said crank case, whereby said orifice is lowered relative to the float chamber in ascending a grade.

In testimony whereof, I have hereunto set my hand at Chicago, Illinois, this 10th day of February, 1921.

CHARLES D. DUNCAN.